United States Patent
Jain et al.

(10) Patent No.: US 10,936,745 B2
(45) Date of Patent: Mar. 2, 2021

(54) ENCRYPTION FOR A MULTI-TENANT FILE SYSTEM

(71) Applicant: International Business Machines Corporation, Armonk, NY (US)

(72) Inventors: Abhishek Jain, Baraut (IN); Anil Laxman Palled, Pune (IN); Deepak Ghuge, Sangamner (IN); Sasikanth Eda, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 16/041,632

(22) Filed: Jul. 20, 2018

(65) Prior Publication Data

US 2020/0026873 A1    Jan. 23, 2020

(51) Int. Cl.
*H04L 9/00* (2006.01)
*G06F 21/62* (2013.01)
*G06F 21/60* (2013.01)
*G06F 21/31* (2013.01)

(52) U.S. Cl.
CPC .......... *G06F 21/6227* (2013.01); *G06F 21/31* (2013.01); *G06F 21/602* (2013.01)

(58) Field of Classification Search
CPC ...... G06F 21/00; G06Q 2250/40; H04L 29/00
See application file for complete search history.

(56) References Cited

U.S. PATENT DOCUMENTS 9,015,493 B2    4/2015 Hu et al.
9,356,782 B2    5/2016 Kitze et al.
2012/0072716 A1*   3/2012 Hu .................. H04L 63/104
                                                      713/156
2015/0207758 A1    7/2015 Mordani et al.
2018/0069699 A1    3/2018 Bowman et al.

FOREIGN PATENT DOCUMENTS

WO    2016/010604 A2    1/2016
WO    2018/044302 A1    3/2018

OTHER PUBLICATIONS

Felipe Knop "IBM Spectrum Scale Security: Secure Data at Rest", IBM Spectrum Scale Security: Secure Data at Rest—Storage Solutions, https://developer.ibm.com/storage/2016/07/29/ibm-spectrum-scale-security-secure-data-rest/ Apr. 14, 2017, pp. 1-5.

* cited by examiner

*Primary Examiner* — Joseph P Hirl
*Assistant Examiner* — Leynna Truvan
(74) *Attorney, Agent, or Firm* — Kunzler Bean & Adamson (57) ABSTRACT

Methods and systems for encrypting data for a multi-tenant filesystem environment are provided. A system for encrypting data for a multitenant filesystem environment includes a file characteristics module that determines file characteristics for a file. The system also includes a user identification module that collects user identification information for one or more file operations, where a file operation in the one or more file operations is performed on a portion of the file. The system further includes a portion information module that gathers portion information about the portion of the file. Additionally, the system includes an encryption module that associates the portion information with a subtenancy encryption key in one or more subtenancy encryption keys based on the user identification information, where the one or more subtenancy encryption keys are associated with the file.

20 Claims, 8 Drawing Sheets

```
"Master_key" = "123456789"
{
    "File-1":  # file_name
    {
        "type": "vmdk",
        "UIDs": {[501, 502]]},
        "blocks": {[x001, x002, x004], [x100, x101, x102]},
        "keys": {["ABCDEFGHIJK", "LMNOPQRSTUV"]}
    },
    "File-2":
    {
        "type": "vhd",
        "UIDs": {[504]},
        "blocks": {[x200, x201]},
        "keys": {["WXYZ"]}
    }
    "FileG003":
    {
        "type": "vrt disk",
        "UIDs": {[0]},
        "blocks": {[x600, x601, x602, x603, x604, x605, x606]},
        "keys": {[None]}
    }
}
```

ENCRYPTION FOR A MULTI-TENANT FILE SYSTEM

FIELD

This invention relates to encrypting data and more particularly relates to methods and systems for encrypting data for a multi-tenant file system.

BACKGROUND

In certain embodiments, a file system may provide support for file encryption that ensures both secure storage and secure deletion of data. The file system may manage encryption using encryption keys and encryption policies. To ensure that data is securely stored, the file system may use encryption to make data unreadable to anyone who does not posses the associated encryption keys. Encryption can protect against attacks targeting the disks as well as attacks performed by unprivileged users of a file system node in a cluster servicing multiple tenants.

A file system may use encryption policies and rules to determine which files need to be encrypted, with which algorithm, and using which encryption keys. Once the policies are in place, the filesystem may apply the policies to newly created files. After the file has been created, and the policies applied to the file, the data in the file may be securely stored. The file system may also use encryption to securely delete data in a file. For example, if data is encrypted, and the encryption key required to decrypt the data has been deleted, that data is effectively no longer retrievable.

SUMMARY

Methods and systems for encrypting data for a multi-tenant filesystem environment are provided. A system for encrypting data for a multitenant filesystem environment includes a file characteristics module that determines file characteristics for a file. The system also includes a user identification module that collects user identification information for one or more file operations, where a file operation in the one or more file operations is performed on a portion of the file. The system further includes a portion information module that gathers portion information about the portion of the file. Additionally, the system includes an encryption module that associates the portion information with a subtenancy encryption key in one or more subtenancy encryption keys based on the user identification information, where the one or more subtenancy encryption keys are associated with the file.

In some embodiments, the file characteristics may include one or more of file type and input/output nature of the file. Also, the encryption module may encrypt the file with a file encryption key in response to file characteristics indicating that the file is not subject to subtenancy. In certain embodiments, the user identification module may acquire the user identification information from one or more operating system hooks. Also, the system includes a data organization module that stores the user identification information, the portion information, and associated subtenancy encryption keys in a subtenancy data structure. In some embodiments, the encryption module may use a master encryption key to encrypt the one or more subtenancy encryption keys.

In certain embodiments the encryption module may include a deletion module that deletes the portion of the file by deleting the subtenancy encryption key associated with the portion of the file. Also, the deletion module may delete the file by deleting a master encryption key associated with the file. Additionally, the encryption module may include a rewrapping module that generates a new subtenancy encryption key for the portion of the file. Further, the rewrapping module may generate a new master encryption key for the file.

One method includes determining file characteristics for a file. The method also includes collecting user identification information for one or more file operations, wherein a file operation in the one or more file operations is performed on a portion of the file. Further, the method includes gathering portion information about the portion of the file. Additionally, the method includes associating the portion information with a subtenancy encryption key in one or more subtenancy encryption keys based on the user identification information, wherein the one or more subtenancy encryption keys are associated with the file.

In some embodiments, file characteristics include one or more of file type and input/output nature of the file. Additionally, the method includes encrypting the file with a file encryption key in response to the file characteristics indicating that the file is not subject to subtenancy. Also, the method includes acquiring the user identification information from one or more operating system hooks. Further, the method includes storing the user identification information, the portion information, and associated subtenancy encryption keys in a subtenancy data structure.

In some embodiments, the method further includes releasing extents in the primary storage device in response to the relationship being suspended. Also, the method includes resetting one or more extent records associated with the released extents in the primary storage device. Further, an extent record in the one or more extent records indicates that an extent on the primary storage device is out-of-synchronization with a corresponding extent on the secondary storage device. Furthermore, the method includes using a master encryption key to encrypt the one or more subtenancy encryption keys.

In certain embodiments, the method further includes deleting the portion of the file by deleting the subtenancy encryption key associated with the portion of the file. Also, the method includes deleting the file by deleting a master encryption key associated with the file. Additionally, the method includes generating a new subtenancy encryption key for the portion of the file.

Also, disclosed are computer program products comprising a computer-readable storage medium including program instructions embodied therewith for providing encryption in a multi-tenant file system environment. Some program instructions executable by a processor can cause the processor to determine file characteristics for a file. Further, the program instructions cause the processor collect user identification information for one or more file operations, wherein a file operation in the one or more file operations is performed on a portion of the file. Also, the program instructions cause the processor to gather portion information about the portion of the file. Additionally, the program instructions cause the processor to associate the portion information with a subtenancy encryption key in one or more subtenancy encryption keys based on the user identification information, wherein the one or more subtenancy encryption keys are associated with the file.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Disclosed herein are various embodiments providing methods, systems, and computer program products that can select locations on a storage device based on characterizations of adjacent location errors. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several storage devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure below may refer to elements of proceeding figures. For instance, like numbers can refer to similar elements in all figures, including alternate embodiments of similar elements.

Figure 1:
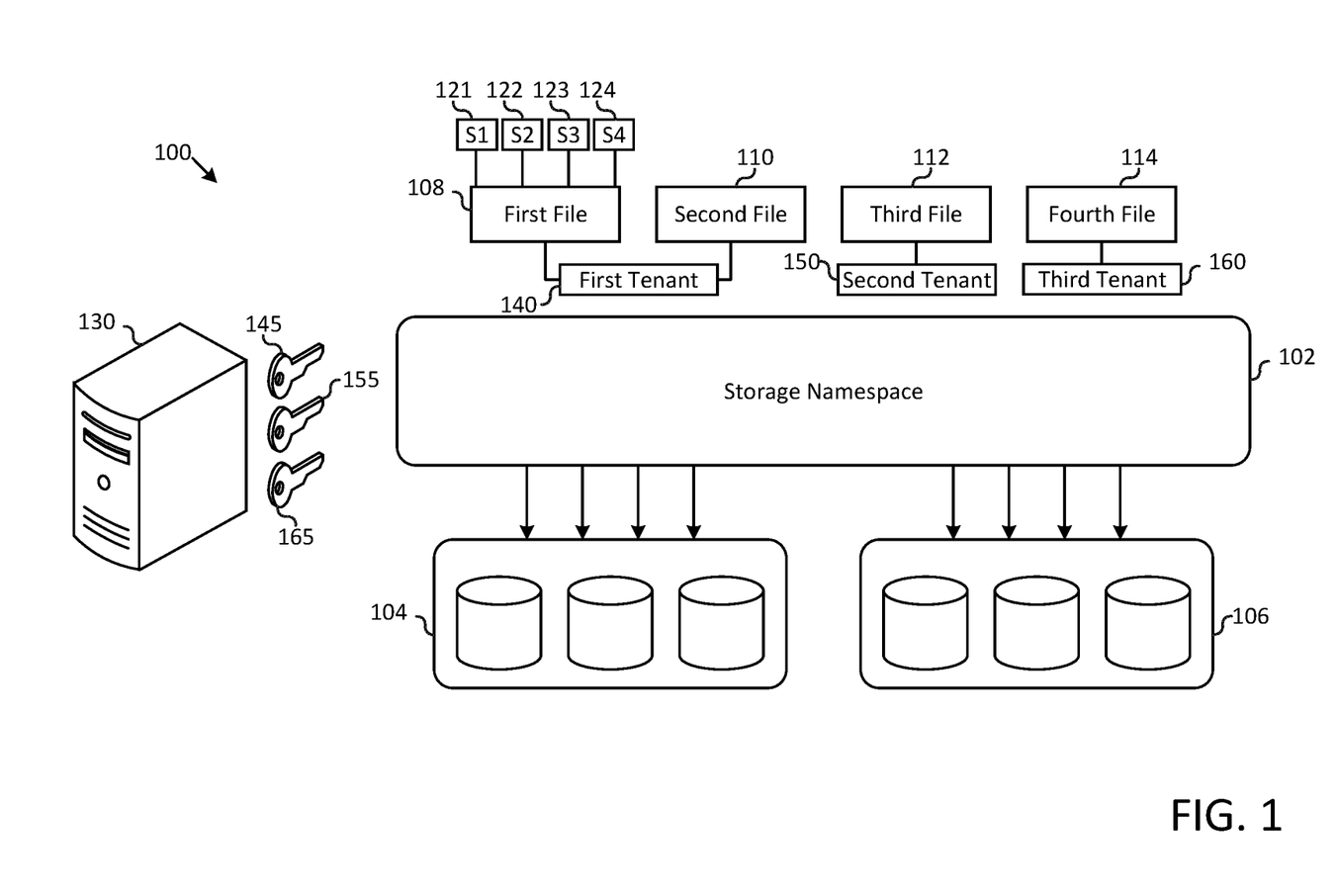
FIG. 1 is a block diagram of one embodiment of a computing system for encrypting data stored on one or more storage devices.

With reference now to the figures, FIG. 1 is a block diagram of one embodiment of a computing system 100 for encrypting data stored on one or more storage devices. As described herein, the computing system 100 may be implemented on one or more separate computing devices. In certain embodiments, the computing system 100 may implement a clustered file system such as a general parallel file system (GPFS). The computing system 100 may include multiple nodes that are able to concurrently access shared files. For example, the computing system 100 may store data on a first storage pool 104 and a second storage pool 106.

Both the first storage pool 104 and the second storage pool 106 may be any suitable type of storage device or cluster of storage devices that are known or developed in the future that can store computer-usable data. In various embodiments, the first storage pool 104 and the second storage pool 106 may each include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with the computing system 100.

In certain embodiments, the first storage pool 104 and the second storage pool 106 may be implemented as a direct-access storage devices (DASD). The first storage pool 104 and the second storage pool 106, in further embodiments, may include non-transitory memory such as, for example, flash memory (e.g., a solid-state device (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein. In some embodiments, one or both of the first storage pool 104 and second storage pool 106 may be a cluster of separate storage devices that are configured to store data.

In various embodiments, the first storage pool 104 and the second storage pool 106 may include non-volatile/persistent hardware and/or software configured to perform long-term data storage operations, including, but not limited to, data archiving, data backup, data mirroring, replicating data, etc. For instance, the first storage pool 104 and the second storage pool 106 may include non-volatile and/or persistent hardware and/or software to perform long-term data storage operations, which may include write operations, read operations, read-write operations, etc., among other operations.

In some embodiments, the computing system 100 may include a storage namespace 102. As used herein, the storage namespace may refer to a convention for providing a namespace for organizing the data stored on the storage pools 104 and 106.

Further, the computing system 100 may provide support for encryption to ensure the secure storage and secure deletion of data. As described herein, encryption may refer to processes for encoding data in such a way that non-authorized parties are unable to access the data. For example, data may be encrypted by using a key to transform the data into an unintelligible representation of the data. As such, only one having the appropriate encryption key may be able to decrypt the data. Also, encryption can be used for securely deleting data. For example, as data may be encrypted and stored within one of the storage pools 104 and 106, the encrypted data may be deleted by deleting the encryption key that is needed to decrypt the data, thus, rendering the data useless.

In certain embodiments, multiple administrative entities may store and access data on the storage pools 104 and 106. As used herein, an administrative entity, that is able to store and access data on the storage pools 104 and 106, may be referred to as a tenant. Where a clustered file system has more than one tenant, the clustered file system may be referred to as a multi-tenant cluster. As illustrated, the computing system 100 may be a multi-tenant cluster having a first tenant 140, a second tenant 150, and a third tenant 160.

In certain embodiments, the computing system 100 may group sets of files in the storage pools 104 and 106 and assign a set of files to a tenant. Further, files assigned to a particular tenant may be encrypted with a single key. For example, the first tenant 140 may be assigned a first file 108 and a second file 110, the second tenant 150 may be assigned a third file 112, and the third tenant 160 may be assigned a fourth file 114. Further, each of the first tenant 140, second tenant 150, and third tenant 160 may have an associated encryption key that is used to encrypt the files associated with a particular tenant. For example, the first tenant 140 may encrypt both the first file 108 and the second file 110 with a first encryption key 145, the second tenant 150 may encrypt the third file 112 with a second encryption key 155, and the third tenant 160 may encrypt the fourth file 114 with a third encryption key 165.

In some embodiments, the computing system 100 may include a key server 130. As used herein, the key server 130 may refer to one or more computing devices that stores encryption keys, where a tenant may communicate with the key server 130 to acquire an encryption key to decrypt data in files assigned to the particular tenant. For example, the key server 130 may store the first encryption key 145 associated with the first tenant 140, the second encryption key 155 associated with the second tenant 150, and the third encryption key 165 associated with the third tenant 160. In certain embodiments, the data stored on the key server 130 may be redundantly stored on other computing devices, where the first tenant 140, the second tenant 150, and the third tenant 160 are able to access the respective encryption keys 145, 155, and 165 on any of the multiple computing devices storing the encryption keys 145, 155, and 165. Alternatively, a key server 130 may be external to the computing system 100 such that the computing system 100 communicates with the key server 130 to acquire the encryption keys 145, 155, and 165.

In certain embodiments, a file belonging to a tenant may be a virtual machine file (such as a VMDK file), where blocks in the file may be owned by multiple subtenants. In the computing system 100, the performance of some file operations by subtenants may negatively affect the operation of the computing system 100. For example, the first file 108 may be owned by the first tenant 140. Additionally, the first file 108 may also be owned by a first subtenant 121, a second subtenant 122, a third subtenant 123, and a fourth subtenant 124 where the different subtenants may be able to perform file operations on different portions of the storage associated with the first file 108. However, if one of the first subtenant 121, second subtenant 122, third subtenant 123, or fourth subtenant 124 attempts to perform a secure delete, the computing system 100 may have to decrypt the first file 108 associated with the first tenant 140 and then re-wrap the first file 108 (absent the portions to be deleted) with a new encryption key associated with the first tenant 140. The decryption and re-encrypting of the first file 108 in response to a file operation directed by one of the subtenants 121-124 may increase the computational overhead of the computing system 100.

Figure 2:
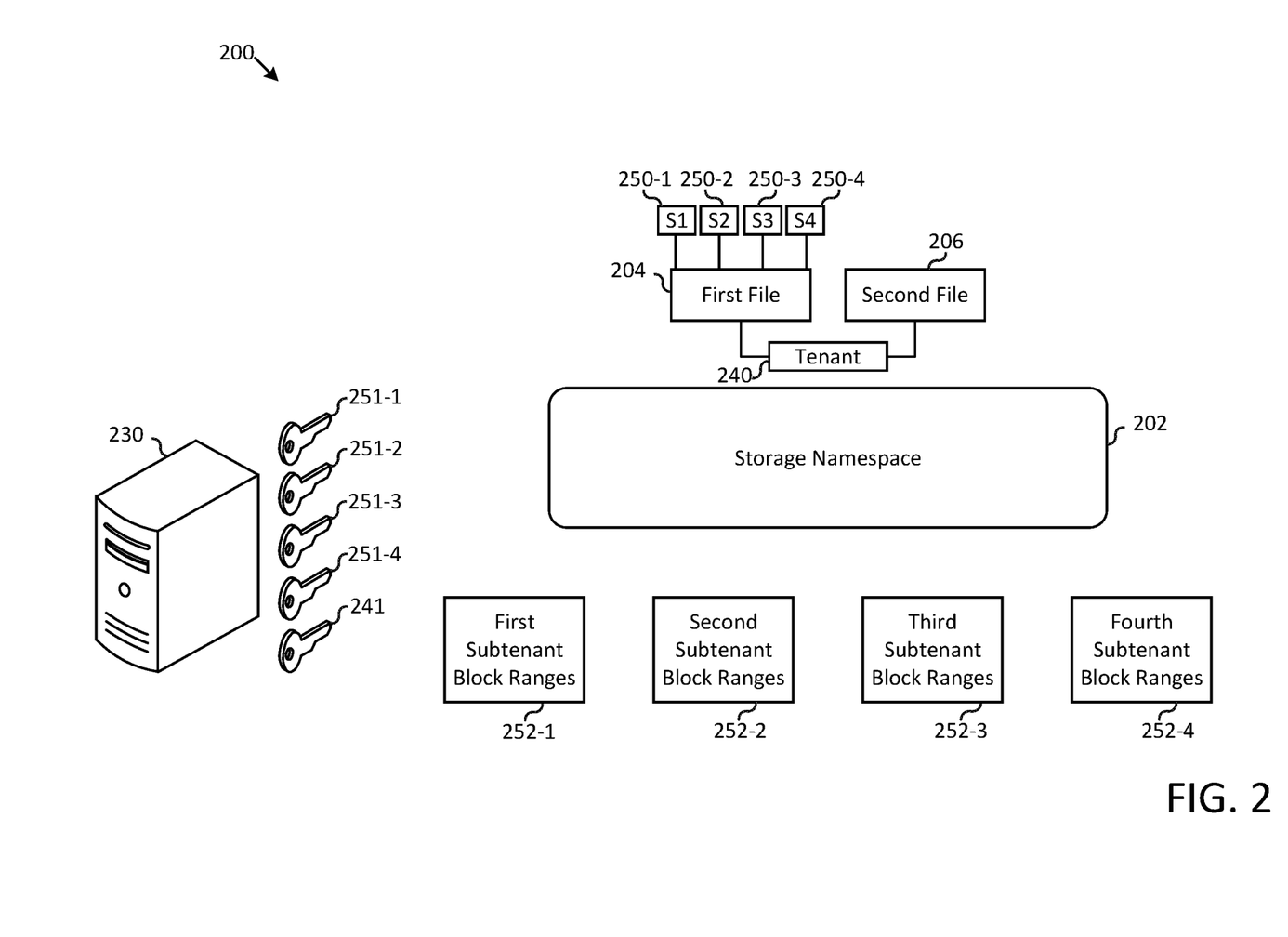
FIG. 2 is a block diagram illustrating another embodiment of a computing system for encrypting data stored on one or more storage devices.

FIG. 2 is a block diagram illustrating another embodiment of a computing system 200 for encrypting data stored on one or more storage devices that decreases the computational overhead of the computing system 200 when certain file operations are performed by subtenants. As illustrated, the computing system 200 may include a storage namespace 202 and key server 230. Both the storage namespace 202 and the key server 230 are substantially similar to the storage namespace 102 and the key server 130 described above in conjunction with FIG. 1. Further, the first file 204 and the second file 206, owned by the tenant 240 are substantially similar to the first file 108 and the second file 110 owned by the tenant 140 in FIG. 1. For example, the first file 204, owned by the tenant 240 is also accessible by a first subtenant 250-1, a second subtenant 250-2, a third subtenant 250-3, and a fourth subtenant 250-4 (hereinafter referred to generally as subtenants 250).

In certain embodiments, each of the subtenants 250 owns (or is associated with) a different range of subtenant block ranges 252-1-252-4 (hereinafter referred to as subtenant block ranges 252) in the first file 204. For example, the first subtenant 250-1 may own the data stored in the first file 204 having the first subtenant block ranges 252-1. Similarly, the second subtenant 250-2 may own the data stored in the first file 204 having the second subtenant block ranges 252-2; the third subtenant 250-3 may own the data stored in the first file 204 having the third subtenant block ranges 252-3, and the fourth subtenant 250-4 may own the data stored in the first file 204 having the fourth subtenant block ranges 252-4.

In some embodiments, each of the subtenants 250 may have an associated subtenancy encryption key 251-1-251-4 (hereinafter referred to as subtenancy encryption keys 251) for encrypting the associated subtenant block ranges 252 in the first file 204. For example, the first subtenant 250-1 may have a first subtenancy encryption key 251-1, where the first subtenancy encryption key 251-1 encrypts the data stored in the first subtenancy block ranges 252-2 for the first file 204. Also, the second subtenant 250-2 may be associated with a second subtenancy encryption key 251-2, where the second subtenancy encryption key 251-2 encrypts the data stored in the second subtenancy block ranges 252-2. Additionally, the third subtenant 250-3 may have a third subtenancy encryption key 251-3, where the third subtenancy encryption key 251-3 encrypts the data stored in the third subtenancy block ranges 252-3. Further, the fourth subtenancy 250-4 may be associated with a fourth subtenancy encryption key 251-4, where the fourth subtenancy encryption key 251-4 encrypts the data stored in the fourth subtenancy block ranges 252-4.

In further embodiments, the tenant 240 may also have an accompanying master encryption key 241. As used herein, a master encryption key 241 may be used to encrypt the subtenancy encryption keys 251. Alternatively, the master encryption key 241 may be used to encrypt the first file 204 after it has been encrypted with the associated subtenancy encryption keys 251.

In certain embodiments, one of the subtenants 250 may attempt to delete one of the subtenant block ranges 252 of the first file 204. To delete the associated subtenant block ranges 252 in the first file 204, the computing system 200 may delete one of the subtenancy encryption keys 251 associated with a particular subtenant 250. For example, if the first subtenant 250-1 initiates a secure delete of the first subtenant block ranges 252-1, the computing system 200 may delete the data stored on the first client block ranges 252-1 by deleting the first subtenancy encryption key 251-1. Upon deletion of the first subtenancy encryption key 251-1, the data associated with the first subtenant 250-1 may be securely deleted.

In some embodiments, one of the subtenants 250 may attempt to delete the first file 204. For example, if the second subtenant 250-2 initiates a secure delete of the blocks associated with the first file 204, the computing system 200 may unwrap files, such as the second file 206, other than the first file 204 that are encrypted by the master encryption key 241 that are associated with the tenant 240. The computing system 200 may then rewrap the second file 206 with a new master encryption key. The computing system 200 may then delete the master encryption key 241 and the subtenancy encryption keys 251. By deleting the master encryption key 241, without rewrapping the first file 204 with the new master encryption key, the first file 204 becomes securely deleted. Alternatively, the second file 206 may be of a file type that does not require encryption. When the first file 204 is the only file associated with the master encryption key 241, to securely delete the first file 204, the computing system 200 may delete the master encryption key 241 and the subtenancy encryption keys 251 that are associated with the first file 204.

In further embodiments, one of the subtenants 250 may initiate a rewrap of one of the subtenant block ranges 252 associated with a particular subtenancy encryption key 251. For example, if the third subtenant 250-3 initiates a rewrap of the third client block ranges 252-3, a new subtenancy encryption key for the third subtenant 250-3 may be generated and stored on the key server 230. The third subtenancy block ranges 252-3 may then be decrypted with the third subtenancy encryption key 251-3 and then re-encrypted with the new subtenancy encryption key. The third subtenancy encryption key 251-3 may then be deleted and the new subtenancy encryption key may be saved as the third subtenancy encryption key 251-3 associated with the third subtenant 250-3.

In additional embodiments, a subtenant 250 may initiate a rewrap of the first file 204 using a new master encryption key. For example, when the fourth subtenant 250-4 initiates a rewrap of the first file 204, a new master encryption key may be generated and saved on the key server 230. In embodiments, where the master encryption key 241 encrypts the subtenancy encryption keys 251, the subtenancy encryption keys 251 may be decrypted using the master encryption key 241. The subtenancy encryption keys 251 may then be encrypted using the new master encryption key, whereupon the master encryption key 241 may be deleted and the new master encryption key may be saved as the master encryption key 241. Alternatively, where the first file 204 is encrypted the master encryption key 241, the first file 204 may be decrypted using the master encryption key 241. The first file 204 may then be re-encrypted using the new master encryption key, whereupon the master encryption key 241 may be deleted and a new master encryption key may be saved as the master encryption key 241. Accordingly, the use of subtenancy encryption keys 251 may provide a framework that provides flexibility to group blocks within a file according to subtenants 250 and methods which allow the encryption/rewrapping of portions of files with different subtenancy encryption keys 251 associated with the subtenants 250.

Figure 3:
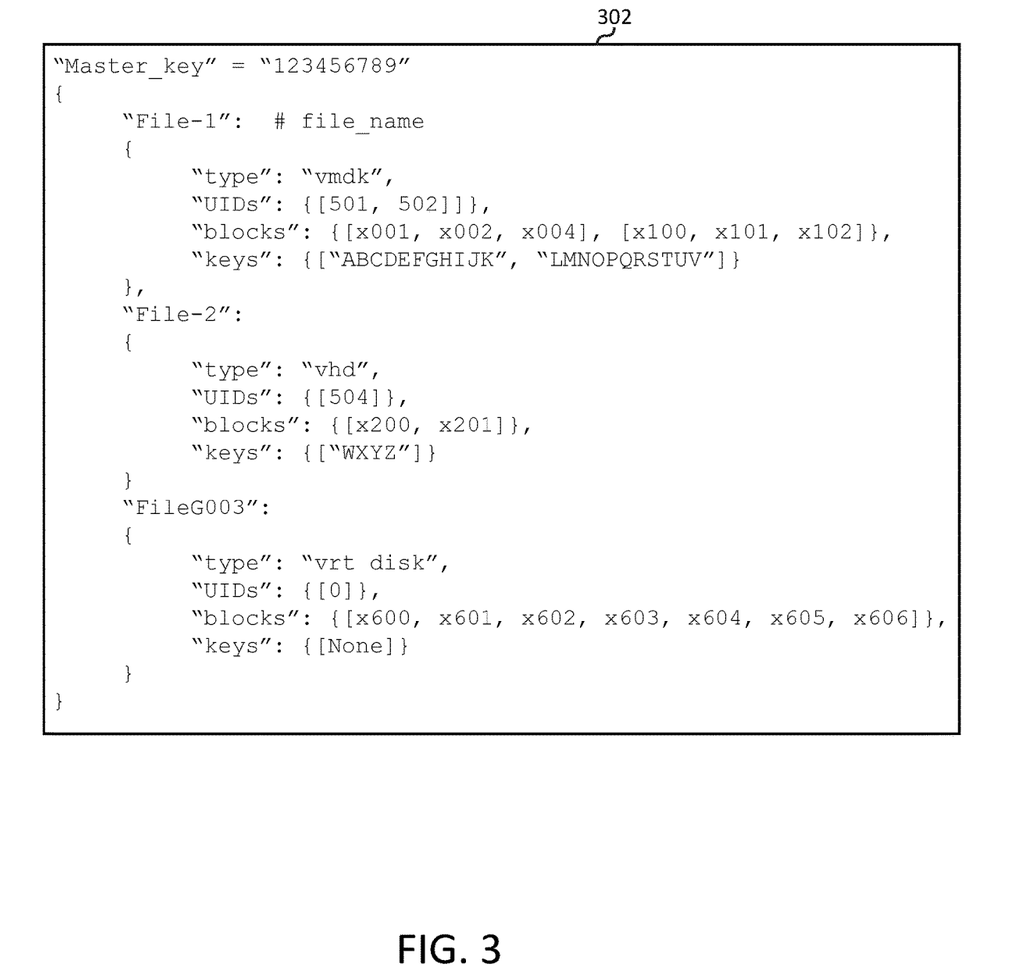
FIG. 3 is a diagram illustrating one embodiment of a data listing for a data structure describing files stored on one or more storage devices.

FIG. 3 is a diagram illustrating one embodiment of a subtenancy data structure 302 for a data structure describing files stored on one or more storage devices. In certain embodiments, information describing subtenants 250 may be stored in a subtenancy data structure 302. A subtenancy data structure 302 may be stored on a key server 230 or other storage device accessible to a controlling processor. As used herein, the subtenancy data structure 302 may refer to a data structure that stores information such as user identification information, filenames, file portion information, subtenancy encryption keys 251 associated with particular subtenants 250, file types, master encryption key information, and other information related to the encryption of files.

As shown in the subtenancy data structure 302, multiple files may be associated with a master encryption key 241. For example, the master encryption key 241 may have the name "Master_key" and may be equal to "123456789." Further, three files, "File-1", "File-2", and "FileG003" may be encrypted using the master encryption key 241 listed in the subtenancy data structure 302. For each file encrypted by the master encryption key, the subtenancy data structure 302 may include information describing subtenants 250 associated with a particular file. For example, the subtenancy data structure 302 may include information describing the file type, user identifications for a particular subtenant 250, file blocks associated with a particular subtenant 250, and subtenancy encryption keys 251 associated with a particular subtenant 250.

With regards to "File-1" (hereinafter referred to as file 1), the file type of file 1 may be identified as a VMDK file. Further, file 1 may be accessed by two separate subtenants 250, where a first subtenant is identified by the user identification number 501 and a second subtenant is identified by the user identification number 502. Additionally, the subtenancy data structure 302 may identify the blocks of data in file 1 that are associated with each subtenant 250. For example, the first subtenant, identified by the user identification number 501, may be associated with the data blocks identified by the block identification numbers x001, x002, x004, and the second subtenant, identified by the user identification number 502, may be associated with the data blocks identified by the block identification numbers x100, x101, and x102.

In some embodiments, a block identification number may refer to a logical address for data blocks in the file or the block identification numbers may refer to another numerical subdivision of a particular file. Also, the subtenancy data structure 302 may identify the subtenancy encryption keys 251 associated with particular subtenants 250. For instance, the first subtenant 501 may be associated with the subtenancy encryption key "ABCDEFGHIJK" and the second subtenant 502 may be associated with the subtenancy encryption key "LMNOPQRSTUV". Accordingly, the subtenancy data structure 302 indicates that blocks associated with the first subtenant, having user identification number 501, may be encrypted with the subtenancy encryption key "ABCDEFGHIJK" and blocks associated with the second subtenant, having user identification number 502, may be encrypted with the subtenancy encryption key "LMNOPQRSTUV".

With regards to "File-2" (hereinafter referred to as file 2), the file type of file 2 may be identified as a "VHD" file. As shown, file 2 may be associated with a single subtenant, where the single subtenant may be identified by the user identification number 504. Additionally, the subtenancy data structure 302 may identify that the single subtenant 504 is associated with data blocks x200 and x201. Further, the subtenancy data structure 302 may identify that the data blocks associated with the single user 504 are encrypted using the subtenancy encryption key "WXYZ".

With regards to "fileG003" (hereinafter referred to as file 3), the file type of file 3 may be identified as a "VRT DISK" file. In contrast to file 1 and file 2, file 3 may not be associated with one or more subtenants. As shown in the subtenancy data structure 302, the user ID for file 3 may be "0" to indicate that there are no subtenants associated with the file. Further, file 3 may include blocks x600, x601, x602, x603, x604, x605, and x606 that are not encrypted with a particular subtenancy encryption key. Accordingly, the subtenancy data structure 302 may include information describing subtenants 250 associated with a file.

Figure 4:
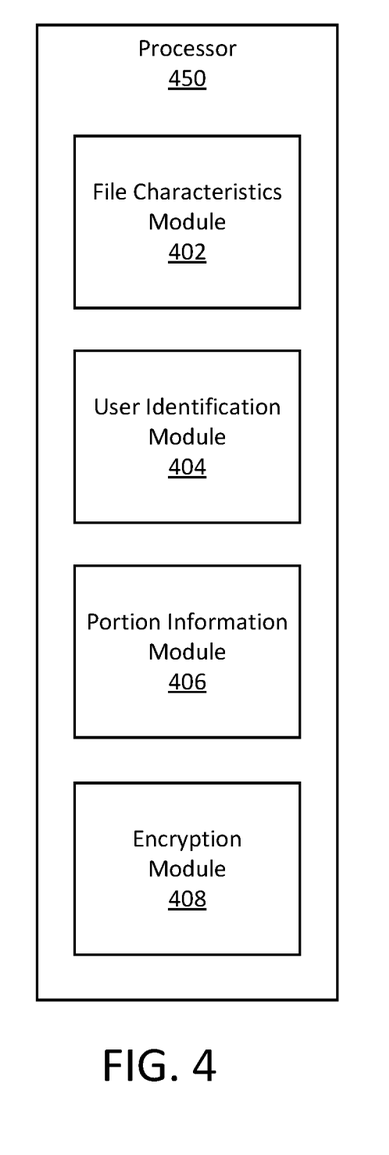
FIG. 4 is a block diagram illustrating one embodiment of a processor configured to encrypt portions of files using subtenancy encryption keys.

FIG. 4 is a block diagram illustrating one embodiment of a processor 450 configured to encrypt portions of files using subtenancy encryption keys. In certain embodiments, as used herein, the processor 450 may be a general-purpose computer, special-purpose computer, multiple processors, or other programmable data processing apparatus. In some embodiments, the processor 450 may be a processor capable of directing the storage of data on storage devices such as those described above in connection with FIGS. 1 and 2. In the depicted embodiment, the processor 450 may include a file characteristics module 402, a user identification module 404, a portion information module 406, and an encryption module 408. As described herein, the file characteristics module 402 may determine file characteristics for a file. Further, as described herein, the user identification module 404 may collect user identification information for one or more file operations, where a file operation in the one or more file operations is performed on a portion of the file. Also, as described herein, the portion information module 406 may gather portion information about the portion of the file. Additionally, as described herein, the encryption module 408 may associate portion information with a subtenancy encryption key 251 in one or more subtenancy encryption keys 251 based on the user identification information, wherein the one or more subtenancy encryption keys 251 are associated with the file.

In certain embodiments, the file characteristics module 402 may be configured to identify file characteristics for a file, where a file is an object on a computer that stores data, information, settings, or commands that may be used with a computer program. As used herein, file characteristics may refer to information that describes a file. For example, file characteristics may include file portion identifiers, file size, file type, input/output nature of the file, and other metadata that may describe characteristics of the file. As used herein, file type may refer to a label used to designate programs associated with the file. Further, as used herein, the input/output nature of the file may refer to how a file both accesses data stored on a storage device, receives data from an input device, and produces data for either storage on a storage device or consumption by a user. In some embodiments, the file characteristics module 402 may save the identified file characteristics in the subtenancy data structure 302. For example, as discussed above, a subtenancy data structure 302 may store file characteristics such as file name and file type.

In some embodiments, the file characteristics module 402 may acquire file characteristics from an operating system that manages one or more system resources associated with the computing system 200. For example, the file characteristics module 402 may acquire file characteristics from operating system hooks when the operating system directs system resources to perform a file operation. As used herein, a file operation may refer to an operation that directs an operating system to move, read, write, copy, execute, or perform any operation that relates to data stored in a particular file. Alternatively, the file characteristics module 402 may acquire file characteristics from a user who may enter the file characteristics upon creation of a file.

In certain embodiments, the user identification module 404 may be configured to collect user identification information for one or more file operations, where a file operation is performed on a portion of the file. As used herein, user identification information may refer to information that describes a user that is accessing a portion of the file. For example, user identification information may include a username, a user identification number, a user password, or other information that may identify a particular user as being associated with a particular portion of the file. Further, as used herein, a portion of a file may refer to a subset of the information contained in a file where the subset of the information may be the entire file, a subdivision of the file, or a group of subdivisions of the file. For example, a portion of a file may be contiguous subsets of information contained in the file or the portion of the file may be noncontiguous subsets of information contained in the file.

In some embodiments, the user identification module 404 may collect the user identification information in a manner similar to the gathering of the file characteristics by the file characteristics module 402. For example, when a file operation is performed, operating system hooks may identify a user and gather user identification information for the user that is associated with the file operation. The user identification module 404 may then save the gathered user identification information in the subtenancy data structure 302, where the user identification information may be associated with identified file characteristics for the file associated with the file operation.

In certain embodiments, the portion information module 406 may gather portion information about the portion of the file. As used herein, portion information may describe the different portions of a file. For example, a file may be divided into different subdivisions, where one or more subdivisions are associated with a particular user or tenant. The portion information module 406 may acquire identification information that determines what parts of the file are included in the portion. For instance, the portion information module 406 may identify which blocks, data range, or other subdivisions of a particular file are part of a particular portion associated with a particular tenant.

In some embodiments, the portion information module 406 may gather the portion information in a manner similar to the determining of file characteristics by the file characteristics module 406 and the collection of user identification information by the user identification module 404. For example, when a file operation is being performed on a particular file, operating system hooks may determine what portions of the file are associated with the file operation. The portion information module 406 may then gather the portion information for the identified portions of the file associated with the file operation and save the portion information in a subtenancy data structure 302, where the portion information is associated with user identification information saved in the subtenancy data structure 302. In some embodiments, the portion information may be saved simultaneously, before, or after the user identification information.

In further embodiments, the encryption module 408 may associate the portion information with subtenancy encryption keys 251 based on the user identification information. As used herein, a subtenancy encryption key 251 may refer to an encryption key that is used to encrypt a portion of the file associated with a particular subtenant 250. For example, upon acquiring the portion information and the user identification information, the encryption module 408 may generate a subtenancy encryption key 251 or acquire the subtenancy encryption key 251 from another source of encryption keys and associate the subtenancy encryption key 251 with the portion information and the user identification information within the subtenancy data structure 302. Further, the encryption module 408 may use the subtenancy encryption keys 251 to encrypt the portions of the file. Further, the encryption module 408 may associate the subtenancy encryption keys 251 with the file associated with the portion information and the user identification information within the subtenancy data structure 302 or other data structure(s) for storing information regarding the subtenancy encryption keys 251.

In additional embodiments, the encryption module 408 may also associate a master encryption key 241 with a tenant. As described above, a tenant may access multiple files that may be described within the subtenancy data structure 302. To encrypt the multiple files, the encryption module 408 may generate a master encryption key 241. As used herein, a master encryption key 241 may be an encryption key that encrypts files associated with a particular tenant. The master encryption key 241 may be generated by the encryption module 408 or may be received from another computing device configured to generate encryption keys. In certain embodiments, the encryption module may use the master encryption key 241 to encrypt the subtenancy encryption keys 251. Alternatively, the encryption module 408 may use the master encryption key 241 to encrypt the associated with the subtenants 250 after the portions of the files (such as the subtenant block ranges 252) have been encrypted using the subtenancy encryption keys 251 associated with the tenant 240.

In further embodiments, file characteristics may indicate that a particular file associated with the tenant 240 is not subject to subtenancy. When a file is not subject to subtenancy, the encryption module 408 may generate a file encryption key. As used herein, a file encryption key may refer to an encryption key that encrypts a file, in contrast to the subtenancy encryption keys 251, which encrypt portions of files. When a file is encrypted with a file encryption key, the file encryption key or encrypted file may be further encrypted by the encryption module 408 using the master encryption key 241.

Figure 5:
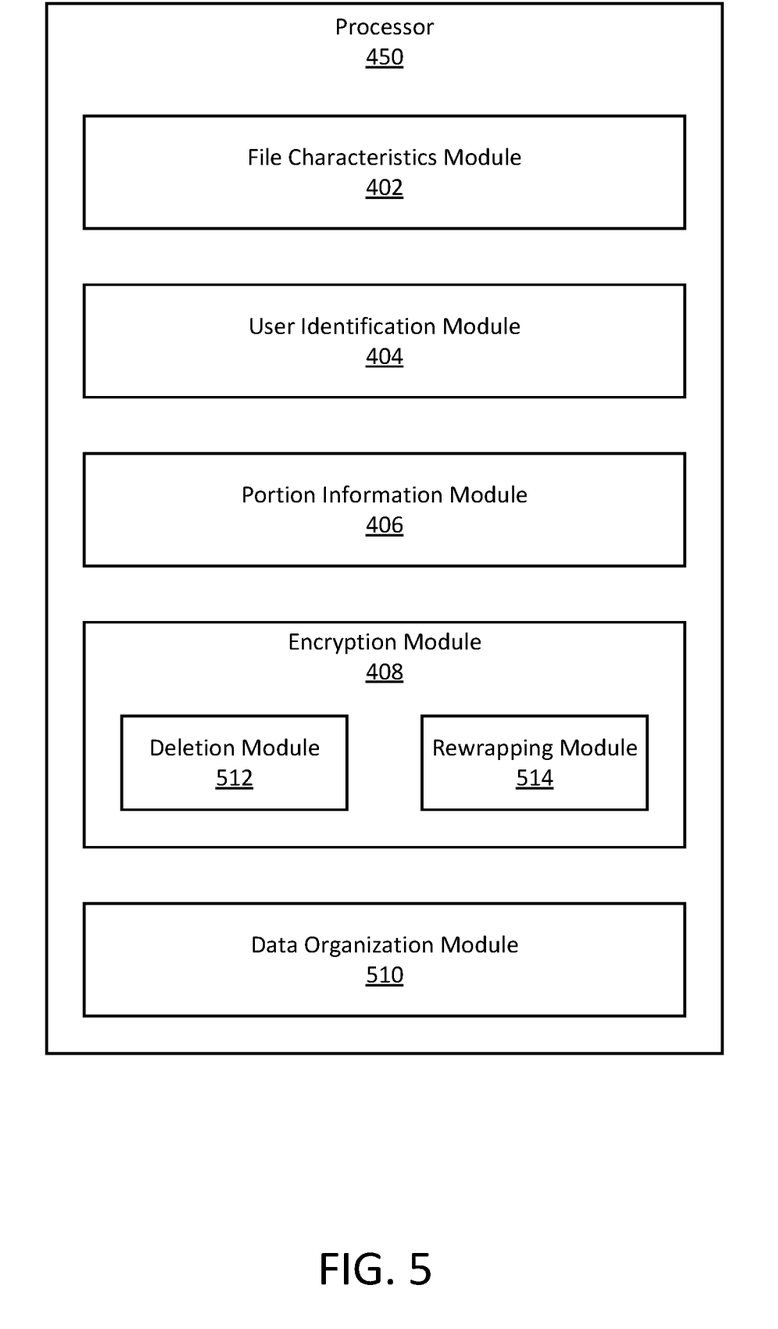
FIG. 5 is a block diagram illustrating a further embodiment of a processor configured to encrypt portions of files using subtenancy encryption keys.

FIG. 5 is a block diagram illustrating a further embodiment of a processor 450 configured to encrypt portions of files using subtenancy encryption keys 251. The processor 450, in various embodiments, may be substantially similar to the processor 450 described above with regards to FIG. 2. In the depicted embodiment, the processor 450 may include a file characteristics module 402, a user identification module 404, a portion information module 406, and an encryption module 408, which may be configured substantially similar as described above with regards to the file characteristics module 402, the user identification module 404, a portion information module 406, and the encryption module 408 of FIG. 4. Additionally, the processor 450 may include a data organization module 510. As described herein, the data organization module 510 may store the user identification information, the portion information, and associated subtenancy encryption keys in a subtenancy data structure. Additionally, the encryption module 408 may include a deletion module 512 and a rewrapping module 514. As described herein, deletion module 512 may delete a portion of a file by deleting a subtenancy encryption key 251 associated with a portion of the file. Additionally, the rewrapping module 514 may generate a new subtenancy encryption key for the portion of the file.

In certain embodiments, the deletion module 512 may control the deletion of file portions and files. As used herein, to delete a file portion or a file is to make data contained in the file portion or the file inaccessible to both the user who directs the deletion of the file and other potential users who may desire to access the file in the future. In some embodiments, when a file is subject to subtenancy, the deletion module 512 may be instructed to delete a portion of the file associated with a particular subtenant. When instructed to delete a file portion associated with the subtenant, the deletion module 512 may delete the subtenancy encryption key 251 associated with the subtenant 250. When the subtenancy encryption key 251 is deleted, file portions associated with the subtenancy encryption key 251 become securely deleted. When a subtenant 250 is associated with multiple file portions that are encrypted using the same subtenancy encryption key 251, and the subtenant 250 wants to delete less than all the file portions associated with the subtenancy encryption key 251. The deletion module 512 may generate a new subtenancy encryption key. Further, the deletion module 512 may use the subtenancy encryption key 251 to decrypt the file portions associated with the subtenancy encryption key 251 other than the file portions that are to be deleted. The deletion module 512 may then encrypt the decrypted file portions. The deletion module 512 may then delete the previous subtenancy encryption key 251, which securely deletes the file portions that were not encrypted with the new subtenancy encryption key.

In further embodiments, the deletion module 512 may be instructed to delete a file associated with the tenant 240. Alternatively, the deletion module 512 may be instructed to delete all files associated with the tenant 240. In embodiments, where the deletion module 512 deletes a single file associated with the tenant 240, the deletion module 512 may identify whether there is more than one file associated with the tenant 240. If there is only one file associated with the tenant 240, the deletion module 512 may delete a master encryption key 241 associated with the tenant 240. In a similar manner, the deletion module 512 may also delete all files associated with the tenant 240, when there are multiple file associated with the tenant 240, by deleting the master encryption key 241 associated with the tenant 240. When the deletion module 512 determines that there are multiple files associated with the tenant 240 and the deletion module 512 is instructed to delete less than all the files associated with the tenant 240, the deletion module 512 may identify the files that are not to be deleted and generate a new master encryption key. The deletion module 512 may then decrypt the files that are not to be deleted using the master encryption key 241 and encrypt the decrypted files with the new master encryption key. The deletion module 512 may then delete the master encryption key 241. Accordingly, the files that were instructed to be deleted by the deletion module 512 may then be securely deleted.

In some embodiments, the rewrapping module 514 may rewrap portions of a file with new subtenancy encryption keys. As used herein, to rewrap a portion of a file with a new subtenancy encryption key, the portion of the file becomes encrypted with the new subtenancy encryption key. For example, the rewrapping module 514 may rewrap a portion of a file by generating a new subtenancy encryption key. The rewrapping module 514 may then decrypt the portion of the file using the subtenancy encryption key 251 and then rewrap the portion of the file using the new subtenancy encryption key. Whereupon, the new subtenancy encryption key may then be saved in place of the original subtenancy encryption key 251. Alternatively, the new subtenancy encryption key may be saved along with the original subtenancy encryption key 251 if there are still file portions that are encrypted with the original subtenancy encryption key 251.

In alternative embodiments, the rewrapping module 514 may rewrap one or more files with a new master encryption key. As used herein, to rewrap a file with a new master encryption key, the files associated with a master encryption key 241 may be decrypted and re-encrypted with the new master encryption key. For example, the rewrapping module 514 may generate a new master encryption key. The rewrapping module 514 may then decrypt the file with the master encryption key 241 and then reencrypt the file with the new master encryption key. As such, the rewrapping module 514 may rewrap either an entire file or a portion of a file associated with a subtenant 250.

In certain embodiments, a data organization module 510 may store information gathered by the file characteristics module 402, the user identification module 404, the portion information module 406, and the encryption module 408 in a subtenancy data structure 302. For example, the data organization module 510 may create a data structure for each tenant 240 that associates a master encryption key 241 with the tenant 240 and the different files associated with the tenant 240. Additionally, for each file, the data organization module 510 may store user identification information for the different subtenants 250 associated with each file and the portions of the file associated with each subtenant 251. Further, for the different subtenants 250, the data organization module 510 may identify the different subtenancy encryption keys 251 associated with the different subtenants 250 within the subtenancy data structure 302. As such, a computing device may lookup desired information within the subtenancy data structure 302, when acquiring information regarding the encryption of data in the files.

Figure 6:
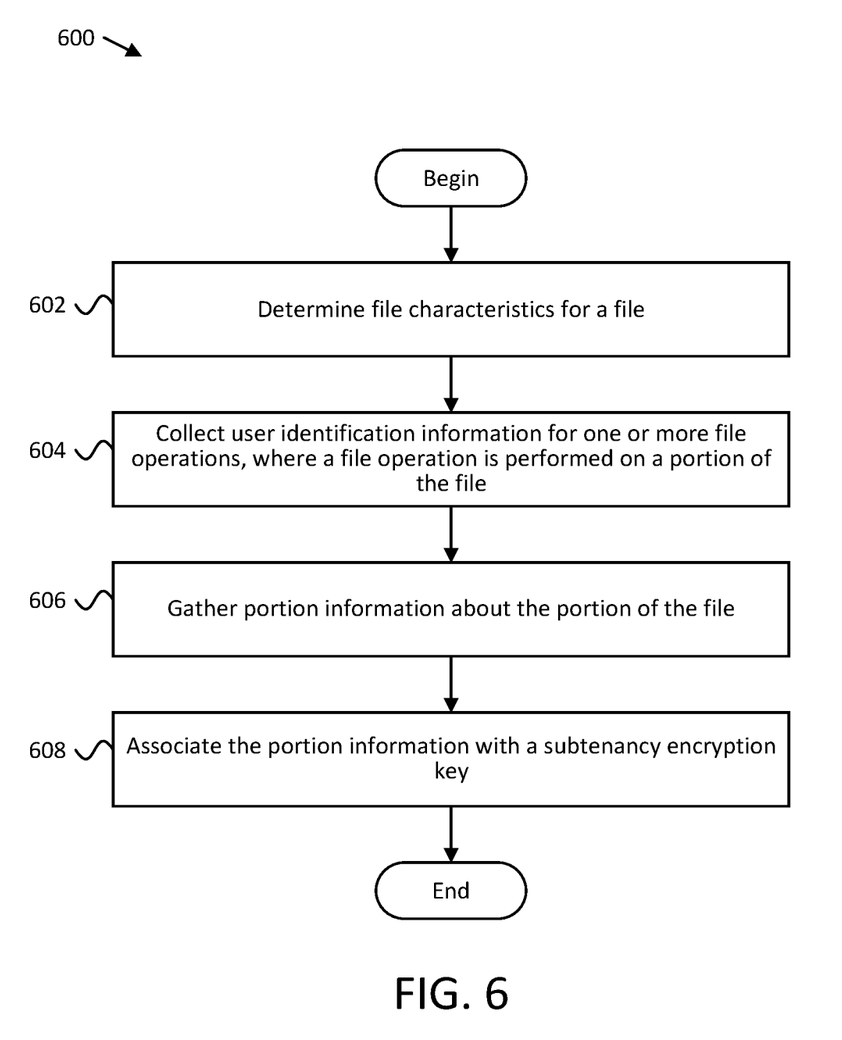
FIG. 6 is a flowchart diagram illustrating one embodiment of a method for encrypting portions of files using subtenancy encryption keys.

FIG. 6 is a flowchart diagram illustrating one embodiment of a method 600 for encrypting portions of files using subtenancy encryption keys 251. Method 600 begins at 602, where file characteristics are determined for a file. Further, Method 600 proceeds at 604, where user identification information is collected for one or more file operations, where a file operation is performed on a portion of the file. Additionally, method 600 proceeds at 606, where portion information is gathered about the portion of the file. Also, method 600 proceeds at 608, where the portion information is associated with a subtenancy encryption key 251. Method 600 then ends.

Figure 7:
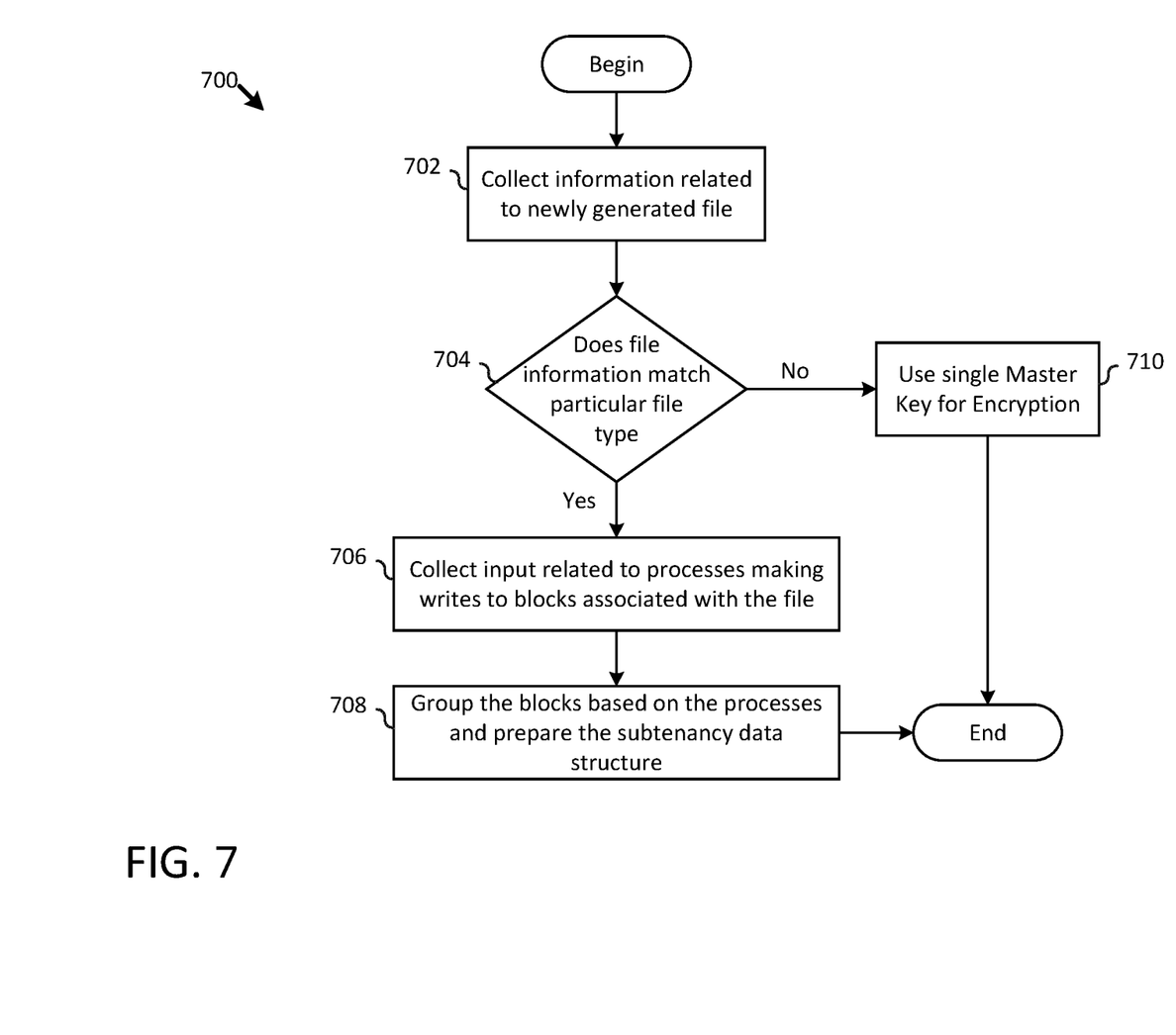
FIG. 7 is a flowchart diagram illustrating one embodiment of a method for organizing information into a subtenancy data structure.

FIG. 7 is a flowchart diagram illustrating one embodiment of a method 700 for organizing information for a file into a subtenancy data structure 302. In certain embodiments, method 700 may be performed by the data organization module 510, processor 450, or other device capable of organizing information into a subtenancy data structure 302. Method 700 begins at 702, where information related to a newly generated file is collected. For example, the gathered information may include information concerning file type, input/output nature of the file, among other file characteristics. Further, method 700 proceeds at 704, where the method 700 determines whether the file information matches a particular file type. For instance, some file types are subject to subtenancy, while other file types are not able to be accessed by separate users and are, accordingly, not subject to subtenancy.

In certain embodiments, when the method 700 determines that a file type is such that the file would not be subject to subtenancy, the method 700 proceeds at 710, where a single master encryption key 241 is used for encrypting the file. When a single master encryption key 241 is used for encrypting the file, the information regarding the encryption of the file may be stored in the subtenancy data structure 302. Alternatively, when the method 700 determines that a file type is such that the file would be subject to subtenancy, the method 700 proceeds at 706, where input, related to processes making writes to blocks associated with the file, is collected. Further, the method 700 proceeds at 708, where blocks are grouped based on the processes and the subtenancy data structure 302 is prepared. For example, each separate process that makes writes to blocks associated with a file may be identified as a subtenant 250 for the file. Information concerning the subtenants 250 and the blocks accessed by the subtenants 250 may be grouped together within the subtenancy data structure 302. Additional information may include subtenancy encryption keys 251, user identification information, master encryption keys 241, file names, among other types of information that may be readily stored within the subtenancy data structure 302. When information for a file is stored in the subtenancy data structure 302, method 700 ends.

Figure 8:
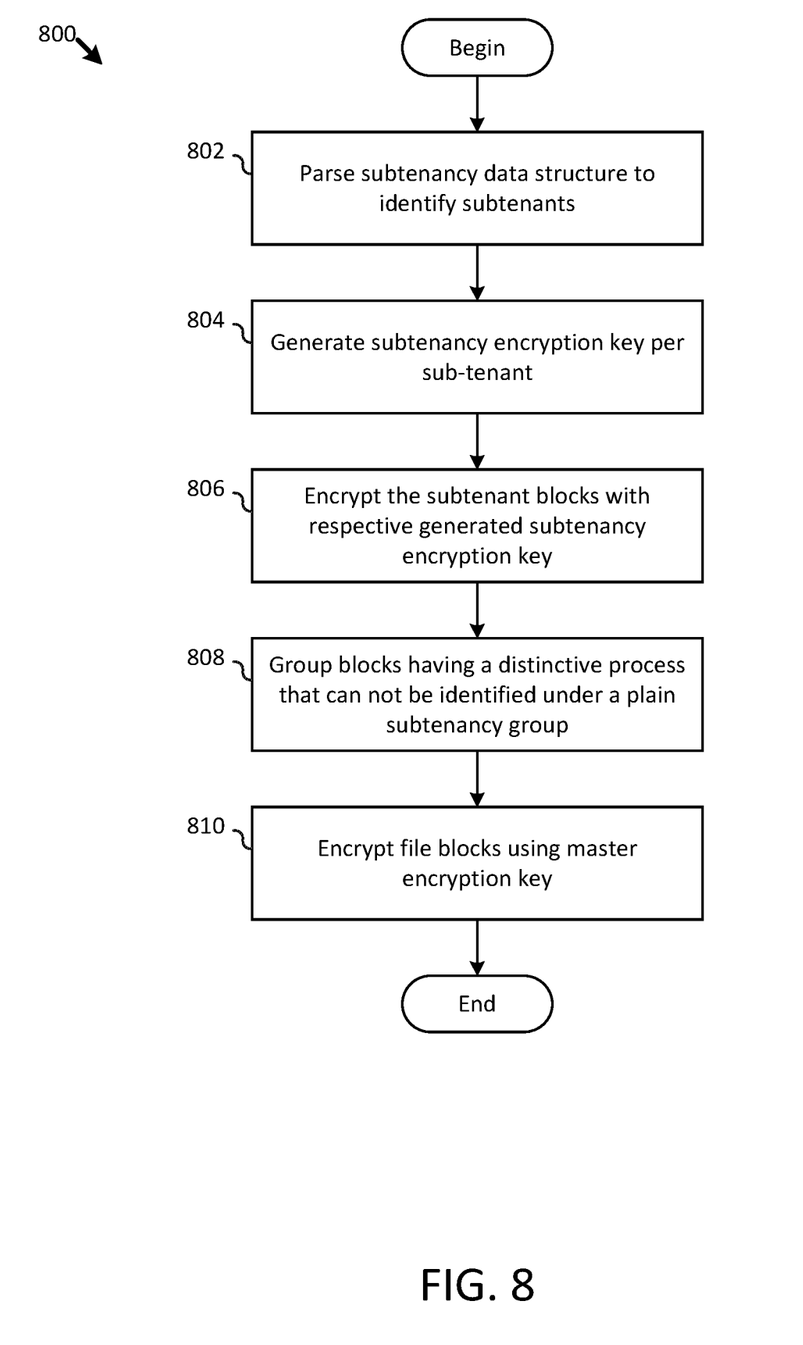
FIG. 8 is a flowchart diagram illustrating one embodiment of a method for encrypting blocks of a file with subtenancy encryption keys.

FIG. 8 is a flowchart diagram illustrating one embodiment of a method 800 for encrypting blocks of a file with subtenancy encryption keys 251. Method 800 proceeds at 802, where a subtenancy data structure 302 is parsed to identify subtenants 250. For example, the subtenancy data structure 302 may be parsed to identify subtenants 250 associated with a particular file. When the subtenancy data structure 302 is parsed, the method 800 proceeds at 804, where a subtenancy encryption key 251 is generated per subtenant 250. For example, for each identified subtenant 250, the encryption module 408 may generate a subtenancy encryption key 251.

In certain embodiments, method 800 proceeds at 806, where the subtenant blocks are encrypted with a respective generated subtenancy encryption key 251. For example, for each subtenant 250, an associated subtenant block range 252 may be encrypted with an associated subtenancy encryption key 251. Further, method 800 proceeds at 808 where blocks having a process that cannot be identified are grouped under a plain subtenancy group. For example, for the blocks associated with the process, a processor 450 may attempt to identify the process to determine if the block is subject to subtenancy. If the block is not subject to subtenancy, the block is encrypted underneath a plain subtenancy group. A plain subtenancy group may be a group where a file and blocks associated with the file are encrypted with the same file encryption key. Method 800 proceeds at 810 where file blocks are encrypted using a master encryption key 241. When the files are encrypted with the master encryption key 241 method 800 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
a file characteristics module that determines a set of file characteristics for a file, wherein:
the file is stored on a storage device shared by a plurality of user tenants,
the file is associated with a particular user tenant of the plurality of user tenants and not with any remaining user tenants of the plurality of user tenants,
the file is encrypted with a master encryption key associated with the particular user tenant, and
the set of file characteristics identifies a plurality of portions of the file;
a user identification module that collects user identification information for one or more file operations performed on the plurality of portions of the file by each subtenant user of the file associated with the particular user tenant;
a portion information module that gathers portion information about each portion of the plurality of portions of the file to associate a particular subtenant user with a particular portion of the file based on the particular subtenant user performing the one or more file operations one the particular portion of the file, wherein:
each subtenant is a subtenant of the file,
each subtenant user of the file is associated with one or more portions of the file, and
each subtenant user is a subtenant of the particular tenant user; and
an encryption module that:
associates a respective subtenancy encryption key of a plurality of subtenancy encryption keys with each particular user, and
encrypts each portion of the file with the respective subtenancy encryption key associated with the particular user subtenant that is associated with each respective particular portion of the file associated with the particular user subtenant,
wherein the master encryption key is configured to decrypt each portion of the file encrypted with each particular subtenancy encryption key.

2. The system of claim 1, wherein the file characteristics include one or more of a file type and an input/output nature of the file.

3. The system of claim 2, wherein the encryption module encrypts the file with a file encryption key that is not subject to subtenancy in response to the file characteristics indicating that the file is not subject to subtenancy.

4. The system of claim 1, wherein the user identification module acquires the user identification information from one or more operating system hooks.

5. The system of claim 1, further comprising a data organization module that stores the user identification information, the portion information, and associated subtenancy encryption keys in a subtenancy data structure.

6. The system of claim 1, wherein the encryption module uses the master encryption key to encrypt each of the subtenancy encryption keys.

7. The system of claim 1, wherein the encryption module comprises a deletion module configured to delete each particular portion of the file by deleting the subtenancy encryption key associated with each respective particular portion of the file.

8. The system of claim 1, wherein the encryption module comprises a deletion module configured to delete the file by deleting the master encryption key associated with the file.

9. The system of claim 1, wherein the encryption module comprises a rewrapping module that generates a new subtenancy encryption key for each portion of the file.

10. The system of claim 9, wherein the rewrapping module generates a new master encryption key for the file.

11. A method, comprising:
determining, by a processor, a set of file characteristics for a file, wherein:
the file is stored on a storage device shared by a plurality of user tenants,
the file is associated with a particular user tenant of the plurality of user tenants and not with any remaining user tenants of the plurality of user tenants,
the file is encrypted with a master encryption key associated with the particular user tenant, and the set of file characteristics identifies a plurality of portions of the file;

collecting user identification information for one or more file operations performed on the plurality of portions of the file by each subtenant user of the file associated with the particular user tenant;

gathering portion information about each portion of the plurality of portions of the file to associate a particular subtenant user with a particular portion of the file based on the particular subtenant user performing the one or more file operations one the particular portion of the file, wherein:
  each subtenant is a subtenant of the file,
  each subtenant user of the file is associated with one or more portions of the file, and
  each subtenant user is a subtenant of the particular tenant user;

associating a respective subtenancy encryption key of a plurality of subtenancy encryption keys with each particular user; and encrypting each portion of the file with the respective subtenancy encryption key associated with the particular user subtenant that is associated with each respective particular portion of the file associated with the particular user subtenant, wherein the master encryption key is configured to decrypt each portion of the file encrypted with each particular subtenancy encryption key.

12. The method of claim 11, wherein the file characteristics include one or more of a file type and an input/output nature of the file.

13. The method of claim 12, further comprising encrypting the file with a file encryption key that is not subject to subtenancy in response to the file characteristics indicating that the file is not subject to subtenancy.

14. The method of claim 11, further comprising acquiring the user identification information from one or more operating system hooks.

15. The method of claim 11, further comprising storing the user identification information, the portion information, and associated subtenancy encryption keys in a subtenancy data structure.

16. The method of claim 11, further comprising using the master encryption key to encrypt each of the subtenancy encryption keys.

17. The method of claim 11, further comprising deleting each particular portion of the file by deleting the subtenancy encryption key associated with each respective particular portion of the file.

18. The method of claim 11, further comprising deleting the file by deleting the master encryption key associated with the file.

19. The method of claim 11, further comprising generating a new subtenancy encryption key for each portion of the file.

20. A computer program product comprising a non-transitory computer-readable storage medium including program instructions embodied therewith, the program instructions executable by a processor to cause the processor to:

determine a set of file characteristics for a file, wherein:
  the file is stored on a storage device shared by a plurality of user tenants,
  the file is associated with a particular user tenant of the plurality of user tenants and not with any remaining user tenants of the plurality of user tenants,
  the file is encrypted with a master encryption key associated with the particular user tenant, and
  the set of file characteristics identifies a plurality of portions of the file;

collect user identification information for one or more file operations performed on the plurality of portions of the file by each subtenant user of the file associated with the particular user tenant;

gather portion information about each portion of the plurality of portions of the file to associate a particular subtenant user with a particular portion of the file based on the particular subtenant user performing the one or more file operations one the particular portion of the file, wherein:
  each subtenant is a subtenant of the file,
  each subtenant user of the file is associated with one or more portions of the file, and
  each subtenant user is a subtenant of the particular tenant user;

associate a respective subtenancy encryption key of a plurality of subtenancy encryption keys with each particular user; and encrypt each portion of the file with the respective subtenancy encryption key associated with the particular user subtenant that is associated with each respective particular portion of the file associated with the particular user subtenant, wherein the master encryption key is configured to decrypt each portion of the file encrypted with each particular subtenancy encryption key.

\* \* \* \* \*